G. O. CHICK
FISH GUARD.
APPLICATION FILED SEPT. 14, 1916.
1,241,708.
Patented Oct. 2, 1917.
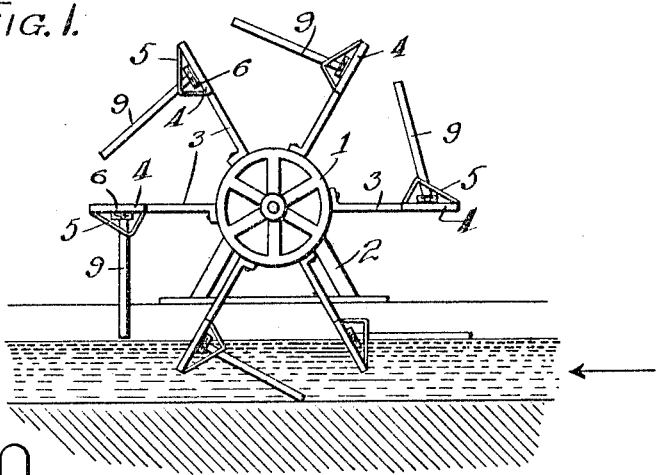
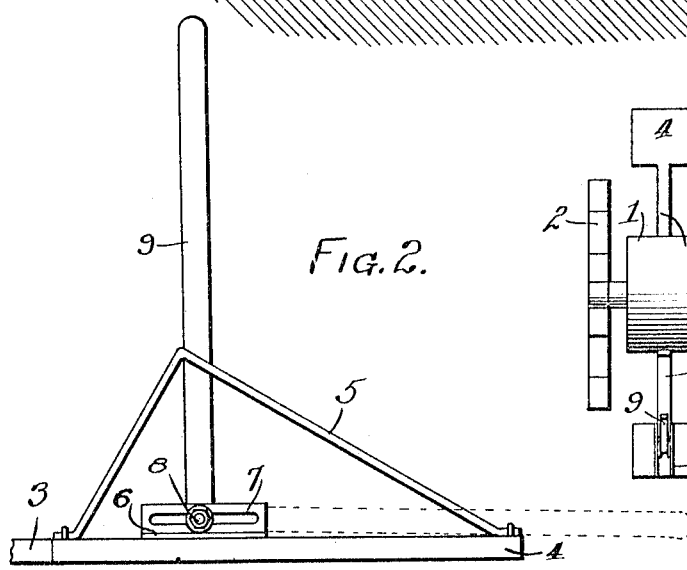
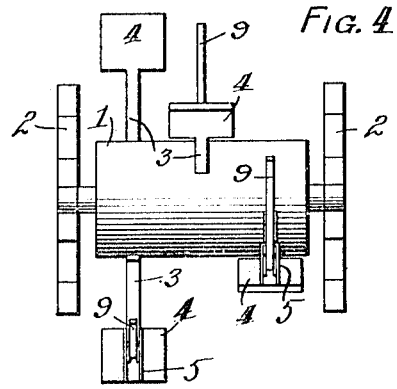
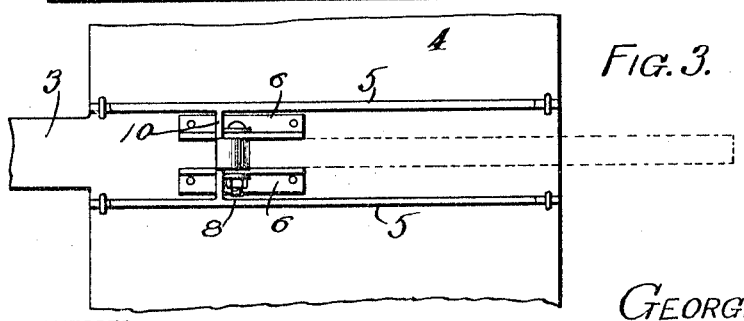
INVENTOR
GEORGE O. CHICK
WITNESSES
R. D. Williams
H. Babcock,
BY Richard B. Oliver
ATTORNEY

UNITED STATES PATENT OFFICE.

GEORGE O. CHICK, OF WIRTH, ARKANSAS.

FISH-GUARD.

1,241,708. Specification of Letters Patent. Patented Oct. 2, 1917.

Application filed September 14, 1916. Serial No. 120,158.

*To all whom it may concern:*

Be it known that I, GEORGE O. CHICK, a citizen of the United States, residing at Wirth, in the county of Sharp and State of Arkansas, have invented certain new and useful Improvements in Fish-Guards, of which the following is a specification.

This invention relates to fish guards, and more particularly to a device adapted to be used for keeping fish out of irrigation ditches.

One of the main objects of the invention is to provide a device of the character stated of simple construction and operation. A further object is to provide a device so constructed that it can be readily operated by the current of the water flowing through an irrigation ditch. A still further object is to provide a guard having a plurality of striking members adapted to strike or beat the water so as to scare fish approaching the same. Further objects will appear from the detail description.

In the drawings:

Figure 1 is a side view of the guard as applied,

Fig. 2 is a fragmentary detail side view of one of the striking rods and its mounting, Fig. 3 is a top plan view of the same, Fig. 4 is a top plan view of the guard.

A drum 1 is rotatably mounted between the end stands or supports 2. This drum is provided with a plurality of series of radially disposed arms 3 secured about the periphery of the same, the arms of one series being staggered relatively to the arms of the succeeding series. The arms 3 are fixedly secured to the drum at their inner ends, and each arm is provided at its outer end with an integral enlargement or paddle 4. Each paddle is provided with a pair of spaced parallel arms 5 of triangular shape secured to the rear face thereof considered from the direction of rotation of the drum when in operation. A pair of angle plates 6 are secured to each paddle 4 in substantial alinement with the apexes of the arms 5. These angle plates are provided with alined slots 7 through their vertical arms. These slots receive a pivot bolt 8 which passes through the lower end of the striking rod 9 so as to pivotally secure the same to the paddle 4. The apexes of the frames 5 are joined by an integral bar 10.

In using my guard, the drum 1 is mounted in the irrigation ditch being supported by the stands 2 which are placed on opposite sides of the ditch. In this position the paddles 4 of the lower arms 3 of the drum will extend downward into the water in the ditch. The water flowing through the ditch will engage these paddles and will rotate the drum, as in Fig. 1 of the drawings, in which the direction of flow of the water in the ditch is indicated by the arrow. As the arm 3 moves upward and forward, the striking rod 9 will rock inward about its pivot so as to engage the cross bar 10. The rod will remain in this position until the arm has moved through an arc of approximately one hundred and ninety degrees, so as to bring the striking rod into such position that it will fall outward about its pivot bolt. This outward movement of the striking rod takes place approximately co-incident with the entry of the arm into the irrigation ditch so that the rod, when it falls downward, will strike the water in the ditch a sharp blow so as to cause splashing and agitation of the same. This continual striking or beating of the water by the striking rods, as the drum rotates, serves effectually to drive any fish which may enter the ditch back to the intake of the river or reservoir from which the water is taken. During the continued rearward movement of the drum, the striking rod drags loosely along the bottom of the irrigation ditch, this being permitted by the pivotal mounting of the inner end of the rod.

As will be clear from Fig. 1 of the drawings, the instant at which the striking rod will fall outward and downward about its pivotal axis will depend upon the angle at which this rod is mounted relative to the paddle 4. By adjusting the pivot bolt 8 in the slots 7 of the angle plates 6 this angle may be varied as desired, thus giving a wide range of adjustment of the striking rods. By this means it is possible to adjust the striking rod so as to insure proper and accurate operation of the same.

The downward and outward movement of the striking rod 9 is positively limited by the paddle 4. By this means, when the rod moves outward about its pivot it imparts an impetus to the paddle which materially assists the rotation of drum 1 thus enabling the device to be operated by a very light current.

There may be changes in the construction and arrangement of the different parts of my invention without departing from the field and scope of the same, and I intend to include all such changes, as fall within the scope of the appended claim, in this application in which a preferred form only of my invention is disclosed.

What I claim is:

In a fish guard, the combination of a rotatable drum, arms rotatably secured thereto and each provided at its outer end with an integral paddle, a pair of parallel spaced rectangular frames secured to the paddle and having their apexes connected by a cross bar, a pair of spaced angle plates secured to the paddle beneath the said frames, said angle plates being provided with alined slots through their vertical walls, a striking rod, and a pivot bolt passed through the lower end of the striking rod and through the slots of the said angle plates.

In testimony whereof I affix my signature in presence of two witnesses.

GEORGE O. CHICK.

Witnesses:
W. R. CHESNUT,
J. W. MCLEAN.

Copies of this patent may be obtained for five cents each, by addressing the "Commissioner of Patents, Washington, D. C."